United States Patent
Kosiak

(10) Patent No.: US 12,012,076 B2
(45) Date of Patent: *Jun. 18, 2024

(54) PREDICTIVE WINDSHIELD WIPER SYSTEM

(71) Applicant: Aptiv Technologies AG, Schaffhausen (CH)

(72) Inventor: Walter K. Kosiak, Kokomo, IN (US)

(73) Assignee: APTIV TECHNOLOGIES AG, Schaffhausen (CH)

( * ) Notice: Subject to any disclaimer, the term of this patent is extended or adjusted under 35 U.S.C. 154(b) by 778 days.

This patent is subject to a terminal disclaimer.

(21) Appl. No.: 16/987,247

(22) Filed: Aug. 6, 2020

(65) Prior Publication Data

US 2020/0361418 A1    Nov. 19, 2020

Related U.S. Application Data

(63) Continuation of application No. 15/674,205, filed on Aug. 10, 2017, now Pat. No. 10,780,860.

(51) Int. Cl.
*B60S 1/08* (2006.01)
*B60W 10/30* (2006.01)
(Continued)

(52) U.S. Cl.
CPC ........... *B60S 1/0844* (2013.01); *B60S 1/0818* (2013.01); *B60S 1/0859* (2013.01); *B60W 10/30* (2013.01);
(Continued)

(58) Field of Classification Search
CPC .... B60S 1/0818; B60S 1/0822; B60S 1/0862; B60S 1/0896; B60S 1/0844; B60S 1/0859
(Continued)

(56) References Cited

U.S. PATENT DOCUMENTS

| | | | | |
|---|---|---|---|---|
| 4,527,105 A | * | 7/1985 | Shiraishi | B60S 1/0859 318/DIG. 2 |
| 10,780,860 B2 | * | 9/2020 | Kosiak | G06V 20/58 |

(Continued)

FOREIGN PATENT DOCUMENTS

| | | |
|---|---|---|
| CN | 103863252 | 6/2014 |
| CN | 103907011 | 7/2014 |

(Continued)

OTHER PUBLICATIONS

"Foreign Office Action", CN Application No. 201810876063.1, dated Jun. 2, 2021, 15 pages.

(Continued)

*Primary Examiner* — Gary K. Graham
(74) *Attorney, Agent, or Firm* — Harness, Dickey & Pierce, P.L.C.

(57) ABSTRACT

A windshield-wiper system includes a precipitation-detector, a windshield-wiper actuator, an object-detector, and a controller. The precipitation-detector detects precipitation proximate to a host-vehicle. The windshield-wiper actuator clears the precipitation from a windshield of the host-vehicle. The object-detector detects a distance of an object to the host-vehicle. The controller is in communication with the precipitation-detector, the windshield-wiper actuator, and the object-detector. The controller determines when the precipitation is present based on the precipitation-detector, determines the distance from the object to the host-vehicle based on the object-detector, and adjusts a speed of the windshield-wiper actuator when the precipitation is detected and the object is less than a distance-threshold away from the host-vehicle.

5 Claims, 11 Drawing Sheets

(51) Int. Cl.
    *B60W 40/02*     (2006.01)
    *G06V 20/58*     (2022.01)

(52) U.S. Cl.
    CPC ............ *G06V 20/58* (2022.01); *B60S 1/0862* (2013.01); *B60W 40/02* (2013.01); *B60W 2554/80* (2020.02); *B60W 2555/20* (2020.02)

(58) Field of Classification Search
    USPC ...................................................... 15/250.12
    See application file for complete search history.

(56) References Cited

U.S. PATENT DOCUMENTS

| | | |
|---|---|---|
| 2005/0174082 A1 | 8/2005 | Tanida |
| 2009/0089955 A1 | 4/2009 | Ohata et al. |
| 2014/0265980 A1 | 9/2014 | Kracker et al. |
| 2015/0094908 A1 | 4/2015 | Hirota et al. |
| 2016/0375863 A1 | 12/2016 | Carlsson et al. |
| 2019/0047518 A1 | 2/2019 | Kosiak |

FOREIGN PATENT DOCUMENTS

| | | |
|---|---|---|
| DE | 102008049983 | 4/2010 |
| DE | 102014212777 | 1/2016 |
| EP | 1881346 | 1/2008 |
| EP | 2883759 | 6/2015 |
| FR | 2865982 | 8/2005 |
| FR | 2970928 | 8/2012 |

OTHER PUBLICATIONS

"Non-Final Office Action", U.S. Appl. No. 15/674,205, dated Dec. 12, 2019, 7 pages.

"Notice of Allowance", U.S. Appl. No. 15/674,205, dated May 29, 2020, 7 pages.

"Restriction Requirement", U.S. Appl. No. 15/674,205, dated Aug. 12, 2019, 5 pages.

"Foreign Office Action", CN Application No. 201810876063.1, dated Apr. 18, 2022, 13 pages.

"Foreign Office Action", CN Application No. 201810876063.1, dated Sep. 15, 2021, 12 pages.

"Extended European Search Report", EP Application No. 18185335.9, dated Jan. 2, 2019, 7 pages.

"Foreign Notice of Allowance", EP Application No. 18185335.9, dated Jul. 8, 2020, 5 pages.

"Foreign Office Action", CN Application No. 201810876063.1, dated Jan. 12, 2022, 19 pages.

\* cited by examiner

PREDICTIVE WINDSHIELD WIPER SYSTEM

CROSS-REFERENCE TO RELATED APPLICATION

This application is a continuation of and claims the benefit under 35 U.S.C. § 120 of U.S. patent application Ser. No. 15/674,205, filed Aug. 10, 2017, the entire disclosure of which is hereby incorporated herein by reference.

TECHNICAL FIELD OF INVENTION

This disclosure generally relates to a windshield-wiper system and more particularly relates to a windshield-wiper system that predicts a sudden change in precipitation.

BACKGROUND

It is known to use a rain-sensor mounted on an interior surface of a windshield to measure a precipitation rate and automatically control a cycling rate of a windshield wiper. The typical rain-sensor must first sense a change in the precipitation-rate before a change in the cycling-rate of the windshield-wiper may be implemented. The delay-time between sensing and actuating becomes a safety issue when a sudden increase in the precipitation-rate occurs, where the typical automatic sensor/wiper system may take several seconds to clear the windshield.

SUMMARY

In accordance with one embodiment, a windshield-wiper system includes a precipitation-detector, a windshield-wiper actuator, an object-detector, and a controller. The precipitation-detector detects precipitation proximate to a host-vehicle. The windshield-wiper actuator clears the precipitation from a windshield of the host-vehicle. The object-detector detects a distance of an object to the host-vehicle. The controller is in communication with the precipitation-detector, the windshield-wiper actuator, and the object-detector. The controller determines when the precipitation is present based on the precipitation-detector, determines the distance from the object to the host-vehicle based on the object-detector, and adjusts a speed of the windshield-wiper actuator when the precipitation is detected and the object is less than a distance-threshold away from the host-vehicle.

In another embodiment, a method of operating a windshield-wiper system includes the steps of detecting precipitation, clearing precipitation, detecting a distance, determining when precipitation is present, determining the distance, and adjusting a speed. The step of detecting precipitation may include detecting, with a precipitation-detector, precipitation proximate to a host-vehicle. The step of clearing precipitation may include clearing, with a windshield-wiper actuator, the precipitation from a windshield of the host-vehicle. The step of detecting a distance may include detecting, with an object-detector, a distance of an object to the host-vehicle. The step of determining when precipitation is present may include determining, with a controller in communication with the precipitation-detector, the windshield-wiper actuator, and the object-detector, when the precipitation is present based on the precipitation-detector. The step of determining the distance may include determining, with the controller, the distance from the object to the host-vehicle based on the object-detector. The step of adjusting a speed may include adjusting, with the controller, a speed of the windshield-wiper actuator when precipitation is detected and the object is less than a distance-threshold away from the host-vehicle.

In yet another embodiment, an automated vehicular windshield-wiper system includes a precipitation-detector, a windshield-wiper, and a controller in communication with the precipitation-detector and the windshield-wiper. The controller determines when a change in a rate of precipitation on a windshield will occur and adjusts a speed of the windshield-wiper to correspond to the rate of precipitation.

In yet another embodiment, a windshield-wiper system includes a precipitation-detector, a windshield-wiper actuator, an object-detector, and a controller. The precipitation-detector detects precipitation proximate to a host-vehicle. The windshield-wiper actuator clears the precipitation from a windshield of the host-vehicle. The object-detector detects an object proximate to the host-vehicle. The controller is in communication with the precipitation-detector, the windshield-wiper actuator, and the object-detector. The controller determines when the precipitation is present based on the precipitation-detector, determines a time-to-contact of the precipitation from the object to the host-vehicle based on the object-detector, and adjusts a speed of the windshield-wiper actuator when the precipitation is detected and the time-to-contact is less than a time-threshold.

Further features and advantages will appear more clearly on a reading of the following detailed description of the preferred embodiment, which is given by way of non-limiting example only and with reference to the accompanying drawings.

BRIEF DESCRIPTION OF THE DRAWINGS

The present invention will now be described, by way of example with reference to the accompanying drawings, in which.

DETAILED DESCRIPTION

Described herein is a predictive windshield-wiper system that predicts a change in a rate of precipitation and adjusts a cycling-rate of a windshield-wiper actuator.

Figure 1:
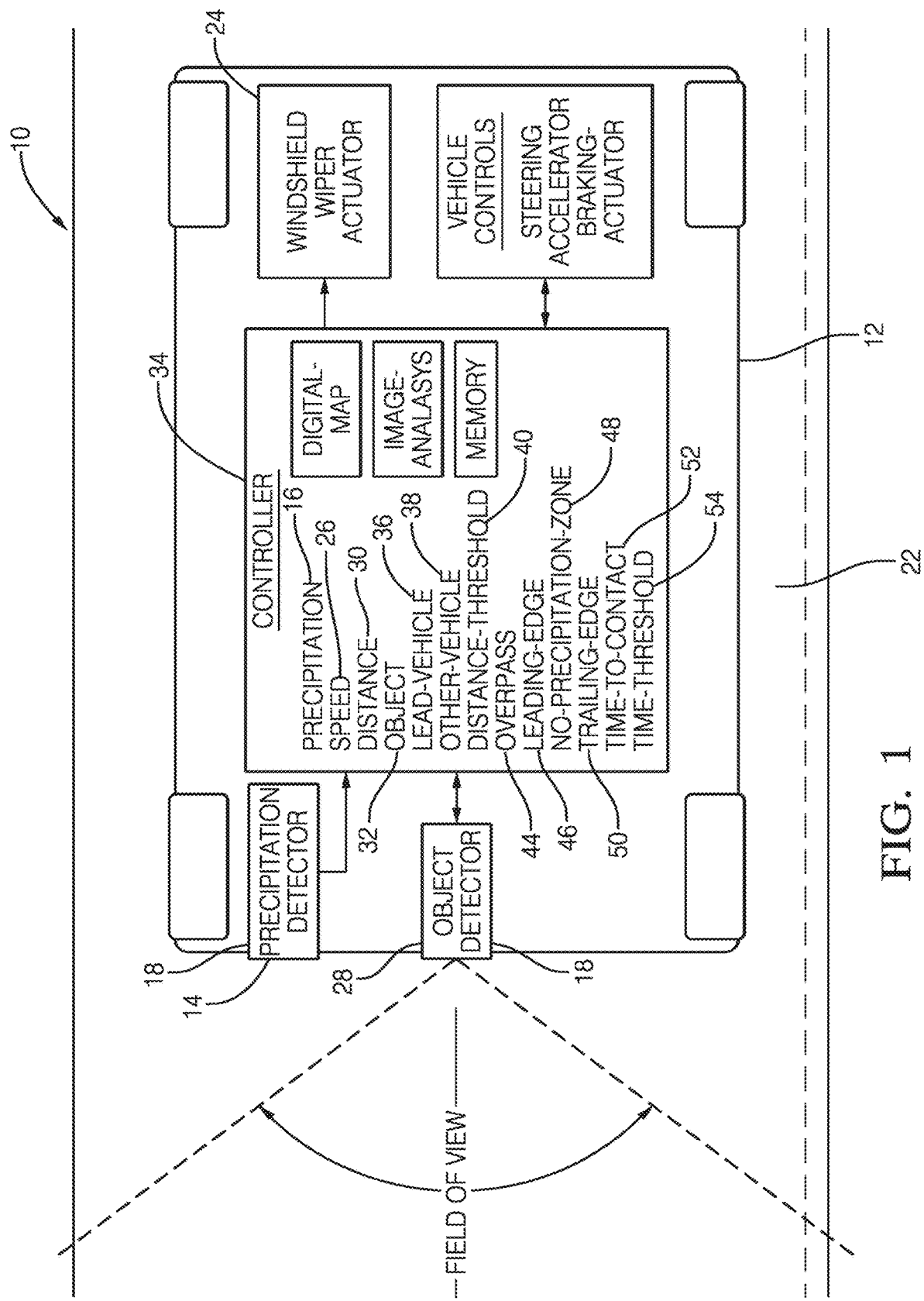
FIG. 1 is an illustration of a windshield-wiper system in accordance with one embodiment.

FIG. 1 illustrates a non-limiting example of a windshield-wiper system 10, hereafter referred to as the system 10, for use on an automated vehicle 12, hereafter referred to as a host-vehicle 12. The system 10 includes a precipitation-detector 14 that detects precipitation 16 proximate to the host-vehicle 12. The precipitation-detector 14 may be a camera 18. Examples of the camera 18 suitable for use on the host-vehicle 12 are commercially available as will be recognized by those in the art, one such being the APTINA MT9V023 from Micron Technology, Inc. of Boise, Id., USA. The camera 18 may be mounted on the front of the host-vehicle 12, or mounted in the interior of the host-vehicle 12 at a location suitable for the camera 18 to view the area around the host-vehicle 12 through a windshield 20 of the host-vehicle 12. The camera 18 is preferably a video-type camera 18 or camera 18 that can capture images of a roadway 22 and surrounding area at a sufficient frame-rate, of ten frames per second, for example. The precipitation-detector 14 may also be an optical-device mounted to an inside-surface of the windshield 20 that detects the precipitation 16 on the windshield 20 of the host-vehicle 12. Examples of the optical-device suitable for use on the host-vehicle 12 are commercially available as will be recognized by those in the art, one such being the RMS3ALS from Robert Bosch LLC of Farmington Hills, Mich., USA. The precipitation-detector 14 may also be a lidar that detects the precipitation 16 before the precipitation 16 reaches the windshield 20. The lidar has the added benefit of being both the precipitation-detector 14 and an object-detector 28.

The system 10 also includes a windshield-wiper actuator 24 that clears the precipitation 16 from the windshield 20 of the host-vehicle 12. The windshield-wiper actuator 24 may include a DC electric-motor, one or more wiper-arms, and a mechanical linkage between the DC electric-motor and the one or more wiper-arms, as will be understood by those in the art. The DC electric-motor may be capable of a range of speeds 26 and/or may be capable of operating in a pulsed mode.

The system 10 also includes the object-detector 28 that detects a distance 30 of an object 32 to the host-vehicle 12. The object-detector 28 may include the camera 18, the lidar, a radar, or any combination thereof. By way of example and not limitation, the radar may be configured to output a continuous or periodic data stream that includes a variety of signal characteristics associated with each object 32 detected. The signal characteristics may include or be indicative of, but are not limited to, the range (i.e. distance 30) to the object 32 from the host-vehicle 12, the azimuth-angle to the object 32 relative to a host-vehicle-longitudinal-axis (not shown), an amplitude (not shown) of the radar-signal, and a relative-velocity of closure (i.e. a range-rate) relative to the object 32. Examples of the radar suitable to detect the object 32 is an Electronically Scanning Radar (ESR) or a Rear-Side-Detection-System (RSDS), or a Short-Range-Radar (SRR) available from Delphi Inc. of Troy, Mich., USA.

The system 10 also includes a controller 34 in communication with the precipitation-detector 14, the windshield-wiper actuator 24, and the object-detector 28. The controller 34 may include a processor (not shown) such as a microprocessor or other control circuitry such as analog and/or digital control circuitry including an application specific integrated circuit (ASIC) for processing data as should be evident to those in the art. The controller 34 may include a memory (not specifically shown), including non-volatile memory, such as electrically erasable programmable read-only memory (EEPROM) for storing one or more routines, thresholds, and captured data. The one or more routines may be executed by the processor to perform steps for determining if a change in the rate of precipitation 16 exists based on signals received by the controller 34 from the precipitation-detector 14 and the object-detector 28, as described herein. The controller 34 may also include an image-analysis device for processing an image captured by the camera 18 that may be used as the object-detector 28. The image detected or captured by the camera 18 is processed by the controller 34 using known techniques for image-analysis to identify the object 32. Vision processing technologies, such as the EYE Q® platform from Moblieye Vision Technologies, Ltd. of Jerusalem, Israel, or other suitable devices may be used.

The controller 34 may analyze the radar-signal to categorize the data from each detected-target (i.e. the object 32) with respect to a list of previously detected-targets having established tracks. As used herein, a track refers to one or more data sets that have been associated with a particular one of the detected-targets. By way of example and not limitation, if the amplitude of the radar-signal is above a predetermined amplitude threshold, then the controller 34 determines if the data corresponds to a previously detected-target or if a new-target has been detected. If the data corresponds to a previously detected-target, the data is added to or combined with prior data to update the track of the previously detected-target. If the data does not correspond to any previously detected-target because, for example, it is located too far away from any previously detected-target, then it may be characterized as a new-target and assigned a unique track identification number. The identification number may be assigned according to the order that data for a new detected-target is received, or may be assigned an identification number according to a grid location in the field-of-view (not specifically shown).

Figure 2:
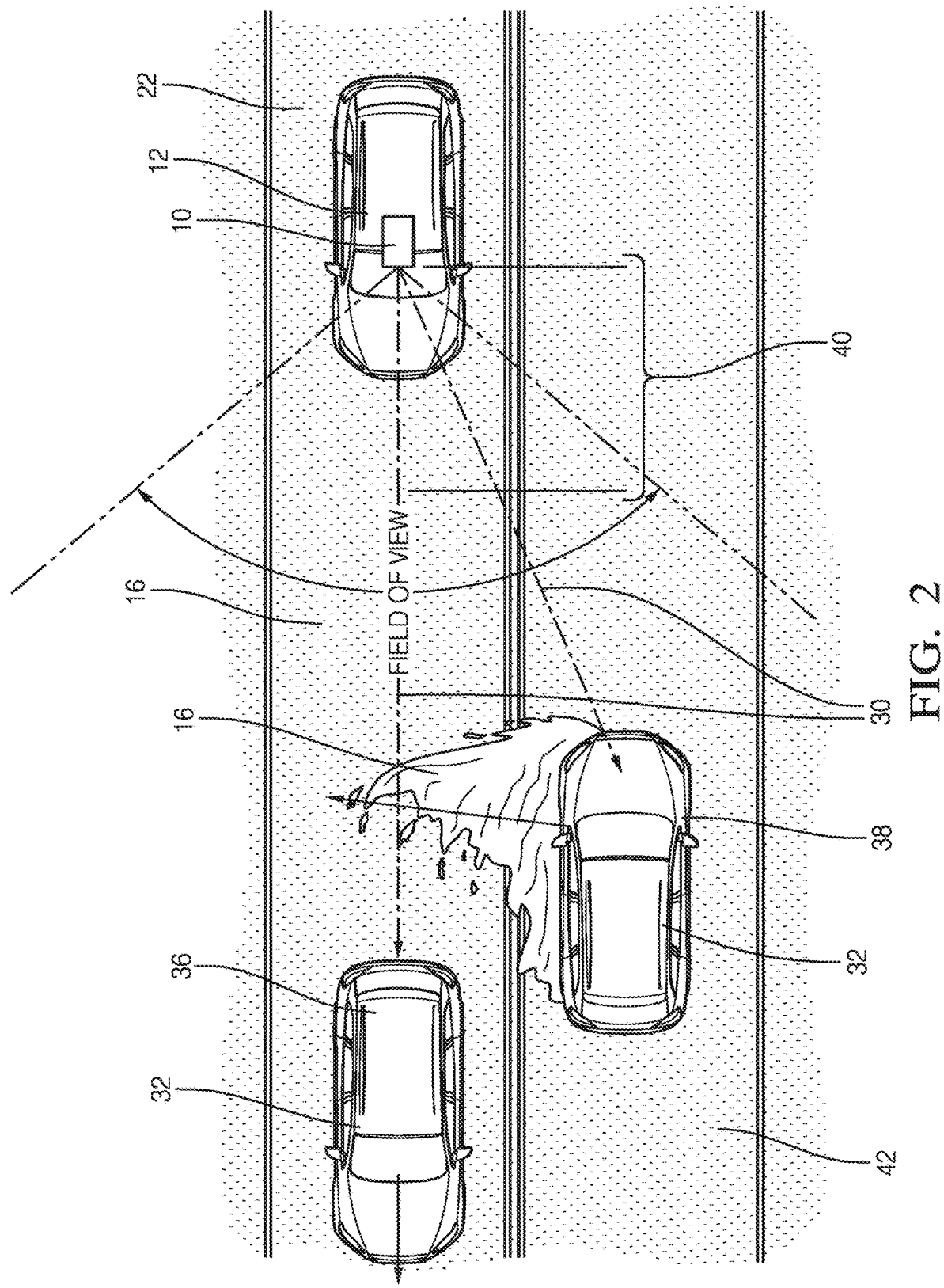
FIG. 2 is an illustration of a traffic scenario of a host-vehicle equipped with the windshield-wiper system of FIG. 1 in accordance with one embodiment.

FIG. 2 illustrates a traffic scenario where the host-vehicle 12 equipped with the system 10 is traveling on the roadway 22 behind a lead-vehicle 36 and an other-vehicle 38 is traveling toward the host-vehicle 12 in an adjacent-lane 42. Precipitation 16 is present (e.g. rain, snow, sleet, slush, etc.) and the other-vehicle 38 is splashing precipitation 16 from the adjacent-lane 42 into a lane traveled by the host-vehicle 12. The controller 34 determines when the precipitation 16 is present based on the precipitation-detector 14, determines the distance 30 from the object 32 to the host-vehicle 12 based on the object-detector 28, and adjusts the speed 26 of the windshield-wiper actuator 24 when the precipitation 16 is detected and the object 32 is less than a distance-threshold 40 away from the host-vehicle 12. That is, the controller 34 predicts when the splash of precipitation 16 from the other-vehicle 38 will contact the windshield 20 of the host-vehicle 12 and increases the speed 26 of the windshield-wiper actuator 24 before the splash reaches the windshield 20. Preferably, the speed 26 of the windshield-wiper actuator 24 will achieve a steady-state value predetermined by the controller 34 prior to the splash contacting the windshield 20. The distance-threshold 40 may be user defined and may be varied based on an identity of the object 32 (e.g. a car or a truck), and/or the relative rate-of-closure between the object 32 and the host-vehicle 12, and/or the type and rate of the precipitation 16.

Alternatively, the controller 34 may determine a time-to-contact 52 of the precipitation 16 from the object 32 (e.g. the other-vehicle 38) to the host-vehicle 12 based on the object-detector 28, and adjust the speed 26 of the windshield-wiper actuator 24 when the precipitation 16 is detected and the time-to-contact 52 is less than a time-threshold 54 (see FIG. 1). Preferably, the speed 26 of the windshield-wiper actuator 24 will achieve the steady-state value predetermined by the controller 34 prior to the precipitation 16 contacting the windshield 20. The time-threshold 54 may be user defined and may be varied based on the identity of the object 32 (e.g. a car or a truck), and/or the relative rate-of-closure between the object 32 and the host-vehicle 12, and/or the type and rate of the precipitation 16.

Figure 3:
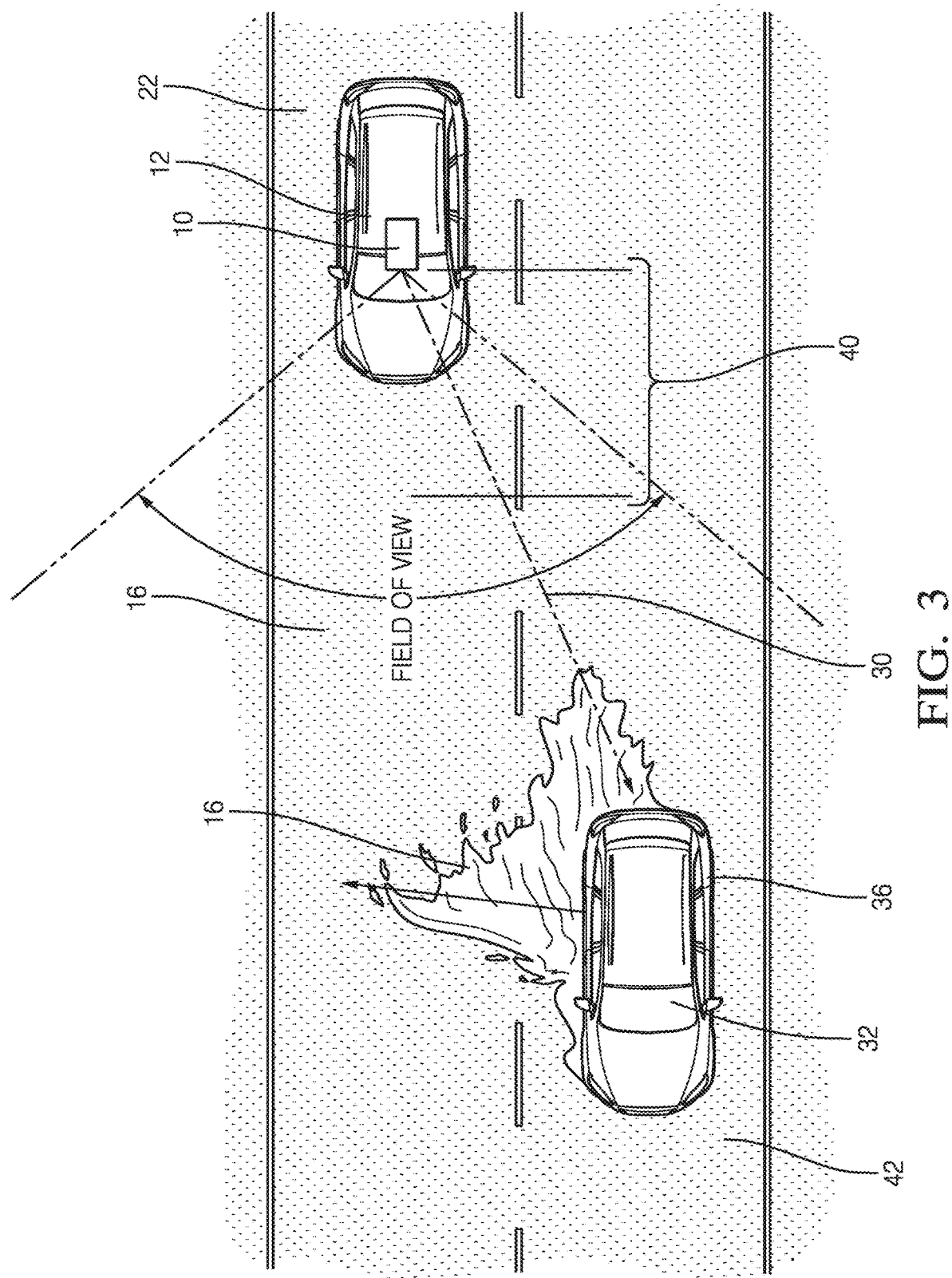
FIG. 3 is an illustration of the host-vehicle of FIG. 2 in another traffic scenario in accordance with one embodiment.

FIG. 3 illustrates another traffic scenario where the host-vehicle 12 equipped with the system 10 is traveling on the roadway 22 behind the lead-vehicle 36 in the adjacent-lane 42. Precipitation 16 is present (e.g. rain, snow, sleet, slush, etc.) and the lead-vehicle 36 is splashing precipitation 16 from the adjacent-lane 42 into the lane traveled by the host-vehicle 12. The controller 34 may increase the speed 26 of the windshield-wiper actuator 24 when the lead-vehicle 36 is less than the distance-threshold 40 away from the host-vehicle 12. While not specifically shown, it will be understood that the system 10 would also function in the traffic scenario where the lead-vehicle 36 is traveling in the same lane as the host-vehicle 12 (see FIG. 2) and the lead-vehicle 36 is splashing precipitation 16 behind the lead-vehicle 36 (e.g. road spray) as the host-vehicle 12 approaches the lead-vehicle 36 from behind.

Figure 4:
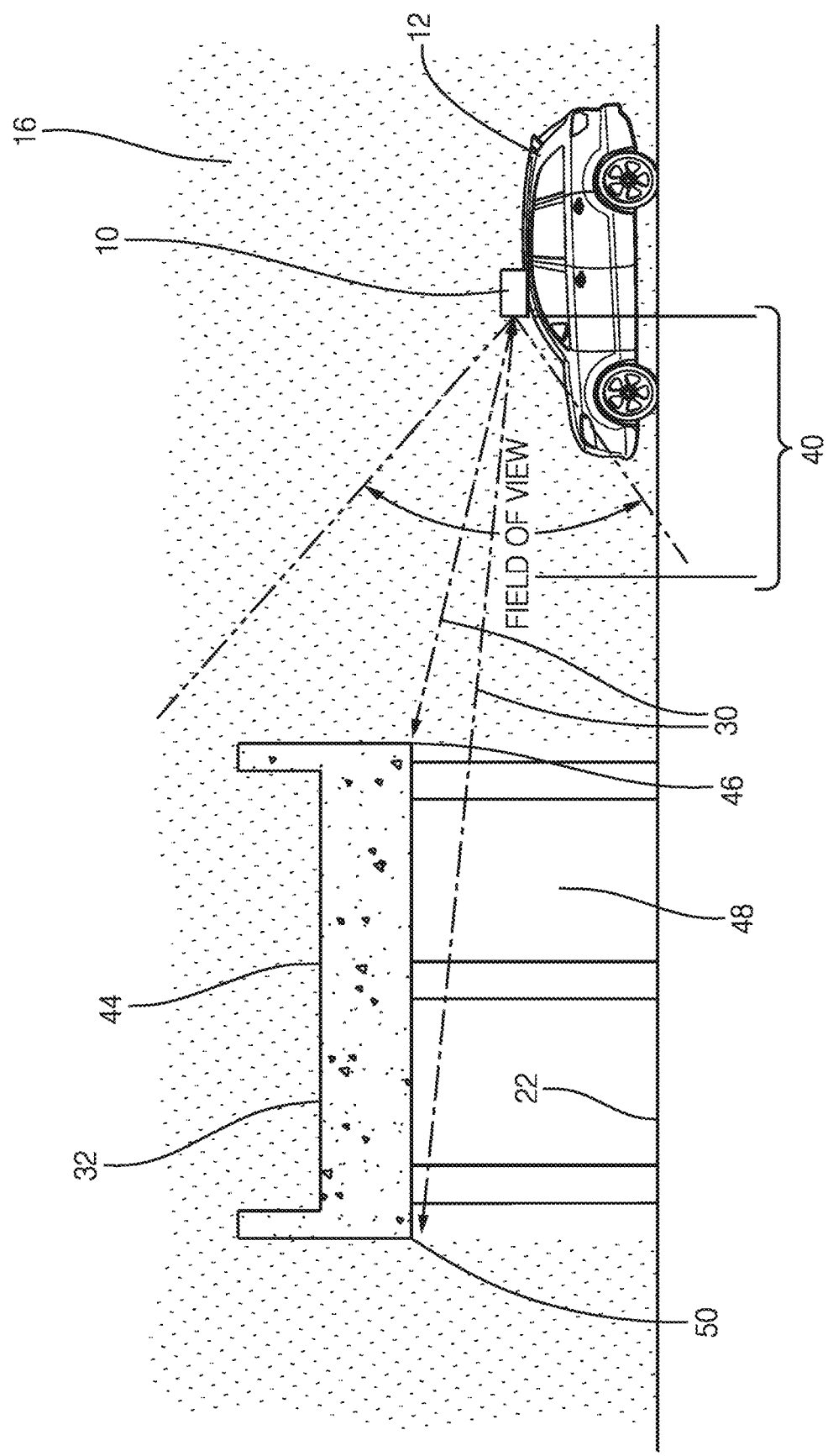
FIG. 4 is an illustration of the host-vehicle of FIG. 2 in yet another traffic scenario in accordance with one embodiment.

FIG. 4 illustrates yet another traffic scenario where the host-vehicle 12 is traveling in precipitation 16 and approaching the object 32 that is an overpass 44. The overpass 44 may include bridges, walkways, and/or tunnels. The controller 34 may determine that the object 32 is the overpass 44 based on signals received from the object-detector 28. The controller 34 may also determine that the object 32 is the overpass 44 based on a digital-map (not specifically shown). The controller 34 may reduce the speed 26 of the windshield-wiper actuator 24 when a leading-edge 46 of the overpass 44 is less than the distance-threshold 40 away from the host-vehicle 12. This is advantageous because the host-vehicle 12 will be entering a no-precipitation-zone 48 as it passes beneath the overpass 44. The distance-threshold 40 may be zero, or may also be a negative-value such that the windshield 20 is within the no-precipitation-zone 48 when the controller 34 reduces the speed 26 of the windshield-wiper actuator 24 to clear any residual precipitation 16. Additionally, the controller 34 may completely stop the actuation of the windshield-wiper actuator 24 when the host-vehicle 12 is beneath the overpass 44 when no precipitation 16 is detected.

Referring again to FIG. 4, the controller 34 may further determine when the host-vehicle 12 will emerge from beneath the overpass 44 (i.e. exit the no-precipitation-zone 48) based on signals received from the object-detector 28, and may increase the speed 26 of the windshield-wiper actuator 24 when the distance 30 of a trailing-edge 50 of the overpass 44 is less than the distance-threshold 40 away from the host-vehicle 12. This is beneficial because the system 10 anticipates the sudden increase in the rate of precipitation 16 as the host-vehicle 12 emerges from beneath the overpass 44 and the operator does not need to manually adjust the windshield-wiper actuator 24.

Figure 5:
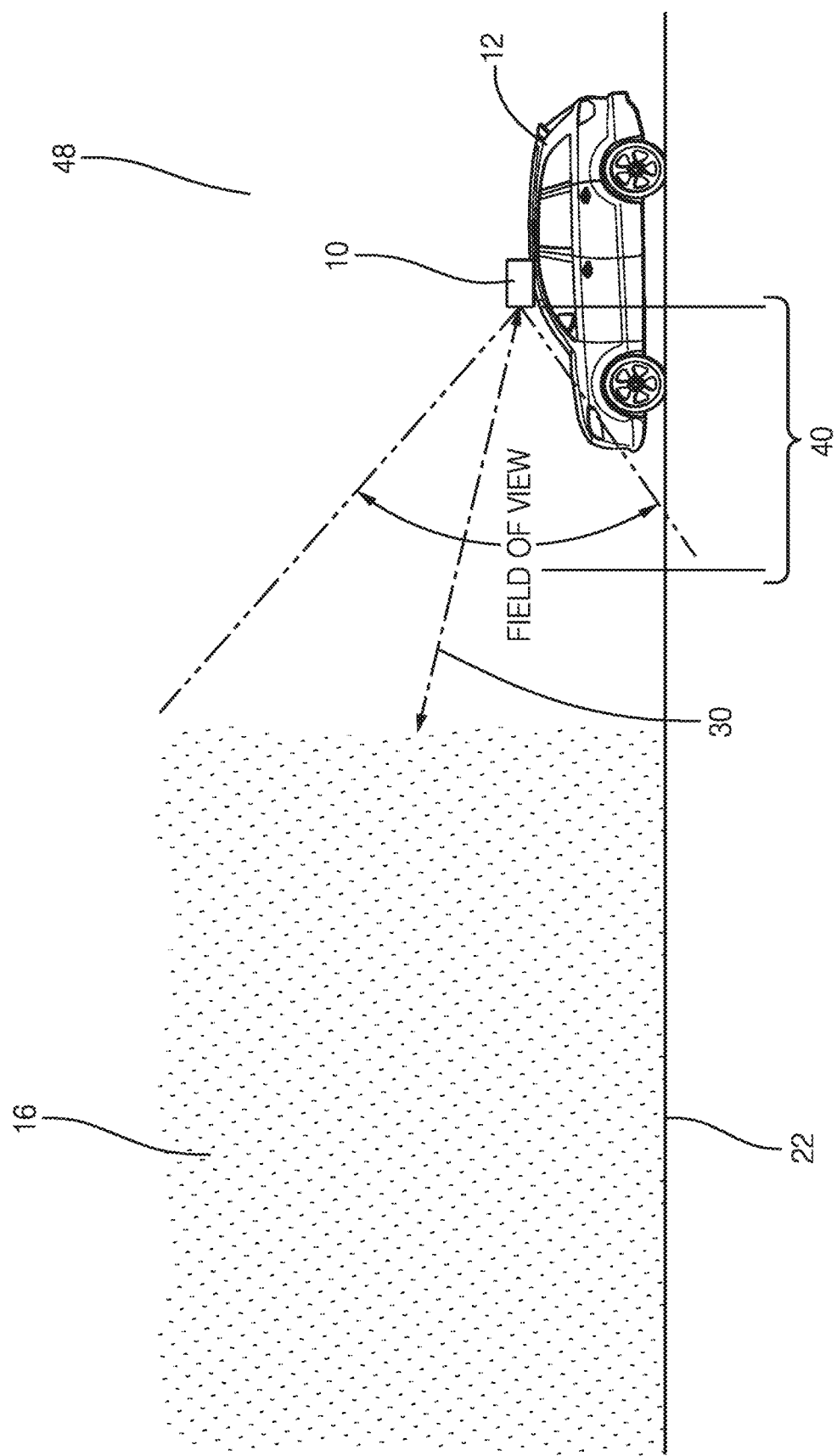
FIG. 5 is an illustration of the host-vehicle of FIG. 2 in yet another traffic scenario in accordance with one embodiment.

FIG. 5 illustrates yet another traffic scenario where the host-vehicle 12 is driving in the no-precipitation-zone 48 and the controller 34 determines the precipitation 16 is present ahead of the host-vehicle 12 based on the signals received from the precipitation-detector 14. The controller 34 may increase the speed 26 of the windshield-wiper actuator 24 when the distance 30 from the precipitation 16 is less than the distance-threshold 40 away from the host-vehicle 12.

Figure 6:
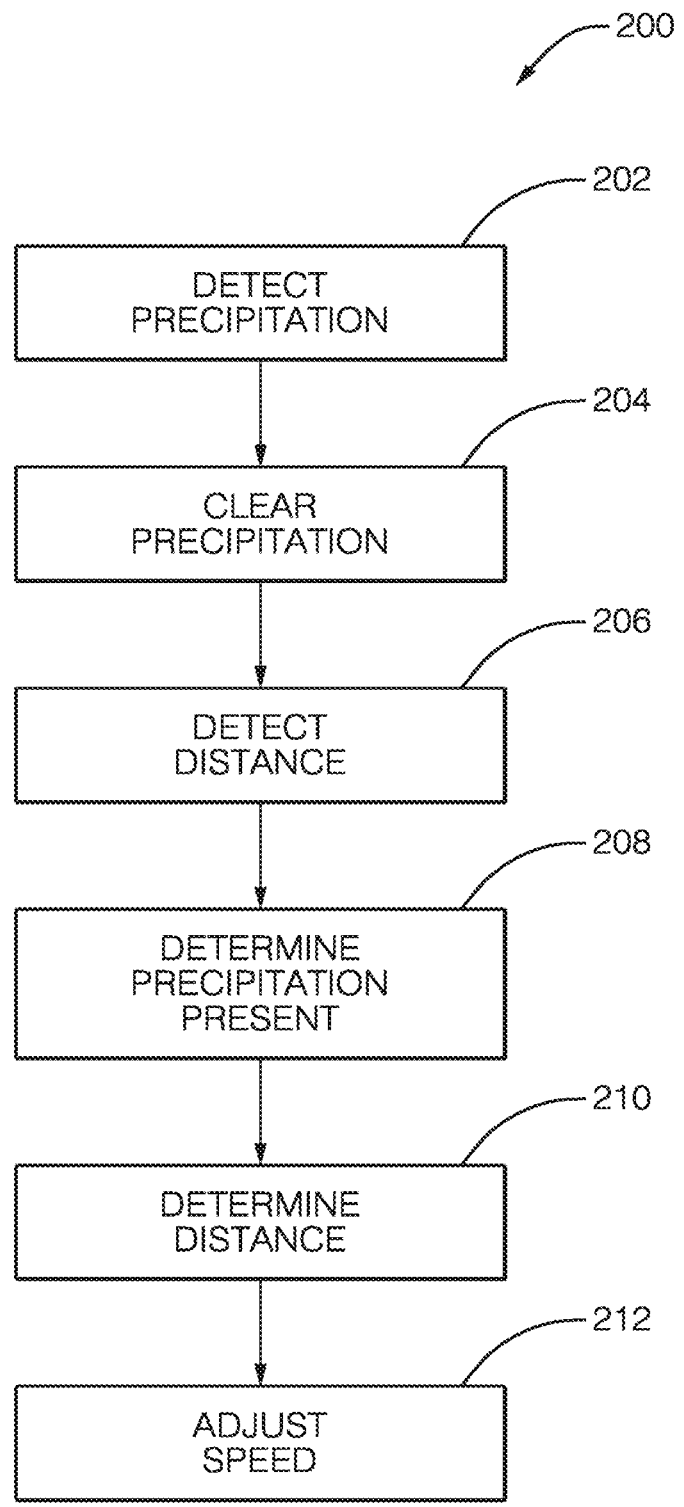
FIG. 6 is a flow-chart of a method of operating the windshield-wiper system of FIG. 1 in accordance with another embodiment.

FIG. 6 illustrates a non-limiting example of a method 200 of operating a windshield-wiper system 10, hereafter referred to as the system 10, for use on an automated vehicle 12, hereafter referred to as a host-vehicle 12.

Step 202, DETECT PRECIPITATION, may include detecting, with a precipitation-detector 14, precipitation 16 proximate to a host-vehicle 12. The precipitation-detector 14 may be a camera 18. Examples of the camera 18 suitable for use on the host-vehicle 12 are commercially available as will be recognized by those in the art, one such being the APTINA MT9V023 from Micron Technology, Inc. of Boise, Id., USA. The camera 18 may be mounted on the front of the host-vehicle 12, or mounted in the interior of the host-vehicle 12 at a location suitable for the camera 18 to view the area around the host-vehicle 12 through a windshield 20 of the host-vehicle 12. The camera 18 is preferably a video-type camera 18 or camera 18 that can capture images of a roadway 22 and surrounding area at a sufficient frame-rate, of ten frames per second, for example. The precipitation-detector 14 may also be an optical-device mounted to an inside-surface of the windshield 20 that detects the precipitation 16 on the windshield 20 of the host-vehicle 12. Examples of the optical-device suitable for use on the host-vehicle 12 are commercially available as will be recognized by those in the art, one such being the RMS3ALS from Robert Bosch LLC of Farmington Hills, Mich., USA. The precipitation-detector 14 may also be a lidar that detects the precipitation 16 before the precipitation 16 reaches the windshield 20. The lidar has the added benefit of being both the precipitation-detector 14 and an object-detector 28.

Step 204, CLEAR PRECIPITATION, may include clearing, with a windshield-wiper actuator 24, the precipitation 16 from the windshield 20 of the host-vehicle 12. The windshield-wiper actuator 24 may include a DC electric-motor, one or more wiper-arms, and a mechanical linkage between the electric-motor and the one or more wiper-arms, as will be understood by those in the art. The electric-motor may be capable of a range of speeds 26 and/or may be capable of operating in a pulsed mode.

Step 206, DETECT DISTANCE, may include detecting, with the object-detector 28, a distance 30 of an object 32 to the host-vehicle 12. The object-detector 28 may include the camera 18, the lidar, a radar, or any combination thereof. By way of example and not limitation, the radar may be configured to output a continuous or periodic data stream that includes a variety of signal characteristics associated with each object 32 detected. The signal characteristics may include or be indicative of, but are not limited to, the range (i.e. distance 30) to the object 32 from the host-vehicle 12, the azimuth-angle (not shown) to the object 32 relative to a host-vehicle-longitudinal-axis (not shown), an amplitude (not shown) of the radar-signal, and a relative-velocity of closure (i.e. a range-rate) relative to the object 32. Examples of the radar suitable to detect the object 32 is an Electronically Scanning Radar (ESR) or a Rear-Side-Detection-System (RSDS), or a Short-Range-Radar (SRR) available from Delphi Inc. of Troy, Mich., USA.

Step 208, DETERMINE PRECIPITATION PRESENT, may include determining, with a controller 34 in communication with the precipitation-detector 14, the windshield-wiper actuator 24, and the object-detector 28, when precipitation 16 is present based on the precipitation-detector 14. The controller 34 may include a processor (not shown) such as a microprocessor or other control circuitry such as analog and/or digital control circuitry including an application specific integrated circuit (ASIC) for processing data as should be evident to those in the art. The controller 34 may include a memory (not specifically shown), including non-volatile memory, such as electrically erasable programmable read-only memory (EEPROM) for storing one or more routines, thresholds, and captured data. The one or more routines may be executed by the processor to perform steps for determining if a change in the rate of precipitation 16 exists based on signals received by the controller 34 from the precipitation-detector 14 and the object-detector 28, as described herein. The controller 34 may also include an image-analysis device for processing an image captured by the camera 18 that may be used as the object-detector 28. The image detected or captured by the camera 18 is processed by the controller 34 using known techniques for image-analysis to identify the object 32. Vision processing technologies, such as the EYE Q® platform from Moblieye Vision Technologies, Ltd. of Jerusalem, Israel, or other suitable devices may be used.

The controller 34 may analyze the radar-signal to categorize the data from each detected-target (i.e. the object 32) with respect to a list of previously detected-targets having established tracks. As used herein, a track refers to one or more data sets that have been associated with a particular one of the detected-targets. By way of example and not limitation, if the amplitude of the radar-signal is above a predetermined amplitude threshold, then the controller 34 determines if the data corresponds to a previously detected-target or if a new-target has been detected. If the data corresponds to a previously detected-target, the data is added to or combined with prior data to update the track of the previously detected-target. If the data does not correspond to any previously detected-target because, for example, it is located too far away from any previously detected-target, then it may be characterized as a new-target and assigned a unique track identification number. The identification number may be assigned according to the order that data for a new detected-target is received, or may be assigned an identification number according to a grid location in the field-of-view (not specifically shown).

FIG. 2 illustrates a traffic scenario where the host-vehicle 12 equipped with the system 10 is traveling on the roadway 22 behind a lead-vehicle 36 and an other-vehicle 38 is traveling toward the host-vehicle 12 in an adjacent-lane 42. Precipitation 16 is present (e.g. rain, snow, sleet, slush, etc.) and the other-vehicle 38 is splashing precipitation 16 from the adjacent-lane 42 into a lane traveled by the host-vehicle 12. The controller 34 may determine when the precipitation 16 is present based on the precipitation-detector 14 as described above.

Step 210, DETERMINE DISTANCE, may include determining, with the controller 34, the distance 30 from the object 32 to the host-vehicle 12 based on the object-detector 28.

Step 212, ADJUST SPEED, may include adjusting, with the controller 34, the speed 26 of the windshield-wiper actuator 24 when the precipitation 16 is detected and the object 32 is less than a distance-threshold 40 away from the host-vehicle 12, as illustrated in FIG. 2. That is, the controller 34 predicts when the splash of precipitation 16 from the other-vehicle 38 will contact the windshield 20 of the host-vehicle 12 and increases the speed 26 of the windshield-wiper actuator 24 before the splash reaches the windshield 20. Preferably, the speed 26 of the windshield-wiper actuator 24 will achieve a steady-state value predetermined by the controller 34 prior to the splash contacting the windshield 20. The distance-threshold 40 may be user defined and may be varied based on an identity of the object 32 (e.g. a car or a truck), and/or the relative rate-of-closure between the object 32 and the host-vehicle 12, and/or the type and rate of the precipitation 16.

FIG. 3 illustrates another traffic scenario where the host-vehicle 12 equipped with the system 10 is traveling on the roadway 22 behind the lead-vehicle 36 in the adjacent-lane 42. Precipitation 16 is present (e.g. rain, snow, sleet, slush, etc.) and the lead-vehicle 36 is splashing precipitation 16 from the adjacent-lane 42 into the lane traveled by the host-vehicle 12. The controller 34 may increase the speed 26 of the windshield-wiper actuator 24 when the lead-vehicle 36 is less than the distance-threshold 40 away from the host-vehicle 12. While not specifically shown, it will be understood that the system 10 would also function in the traffic scenario where the lead-vehicle 36 is traveling in the same lane as the host-vehicle 12 (see FIG. 2) and the lead-vehicle 36 is splashing precipitation 16 behind the lead-vehicle 36 (e.g. road spray) as the host-vehicle 12 approaches the lead-vehicle 36 from behind.

FIG. 4 illustrates yet another traffic scenario where the host-vehicle 12 is traveling in precipitation 16 and approaching the object 32 that is an overpass 44. The overpass 44 may include bridges, walkways, and/or tunnels. The controller 34 may determine that the object 32 is the overpass 44 based on signals received from the object-detector 28. The controller 34 may also determine that the object 32 is the overpass 44 based on a digital-map (not specifically shown). The controller 34 may reduce the speed 26 of the windshield-wiper actuator 24 when a leading-edge 46 of the overpass 44 is less than the distance-threshold 40 away from the host-vehicle 12. This is advantageous because the host-vehicle 12 will be entering a no-precipitation-zone 48 as it passes beneath the overpass 44. The distance-threshold 40 may be zero, or may also be a negative-value such that the windshield 20 is within the no-precipitation-zone 48 when the controller 34 reduces the speed 26 of the windshield-wiper actuator 24 to clear any residual precipitation 16. Additionally, the controller 134 may completely stop the actuation of the windshield-wiper actuator 24 when the host-vehicle 12 is beneath the overpass 44 when no precipitation 16 is detected.

Referring again to FIG. 4, the controller 34 may further determine when the host-vehicle 12 will emerge from beneath the overpass 44 (i.e. exit the no-precipitation-zone 48) based on signals received from the object-detector 28, and may increase the speed 26 of the windshield-wiper actuator 24 when the distance 30 of a trailing-edge 50 of the overpass 44 is less than the distance-threshold 40 away from the host-vehicle 12. This is beneficial because the system 10 anticipates the sudden increase in the rate of precipitation 16 as the host-vehicle 12 emerges from beneath the overpass 44 and the operator does not need to manually adjust the windshield-wiper actuator 24.

FIG. 5 illustrates yet another traffic scenario where the host-vehicle 12 is driving in the no-precipitation-zone 48 and the controller 34 determines the precipitation 16 is present ahead of the host-vehicle 12 based on the signals received from the precipitation-detector 14. The controller 34 may increase the speed 26 of the windshield-wiper actuator 24 when the distance 30 from the precipitation 16 is less than the distance-threshold 40 away from the host-vehicle 12.

Figure 7:
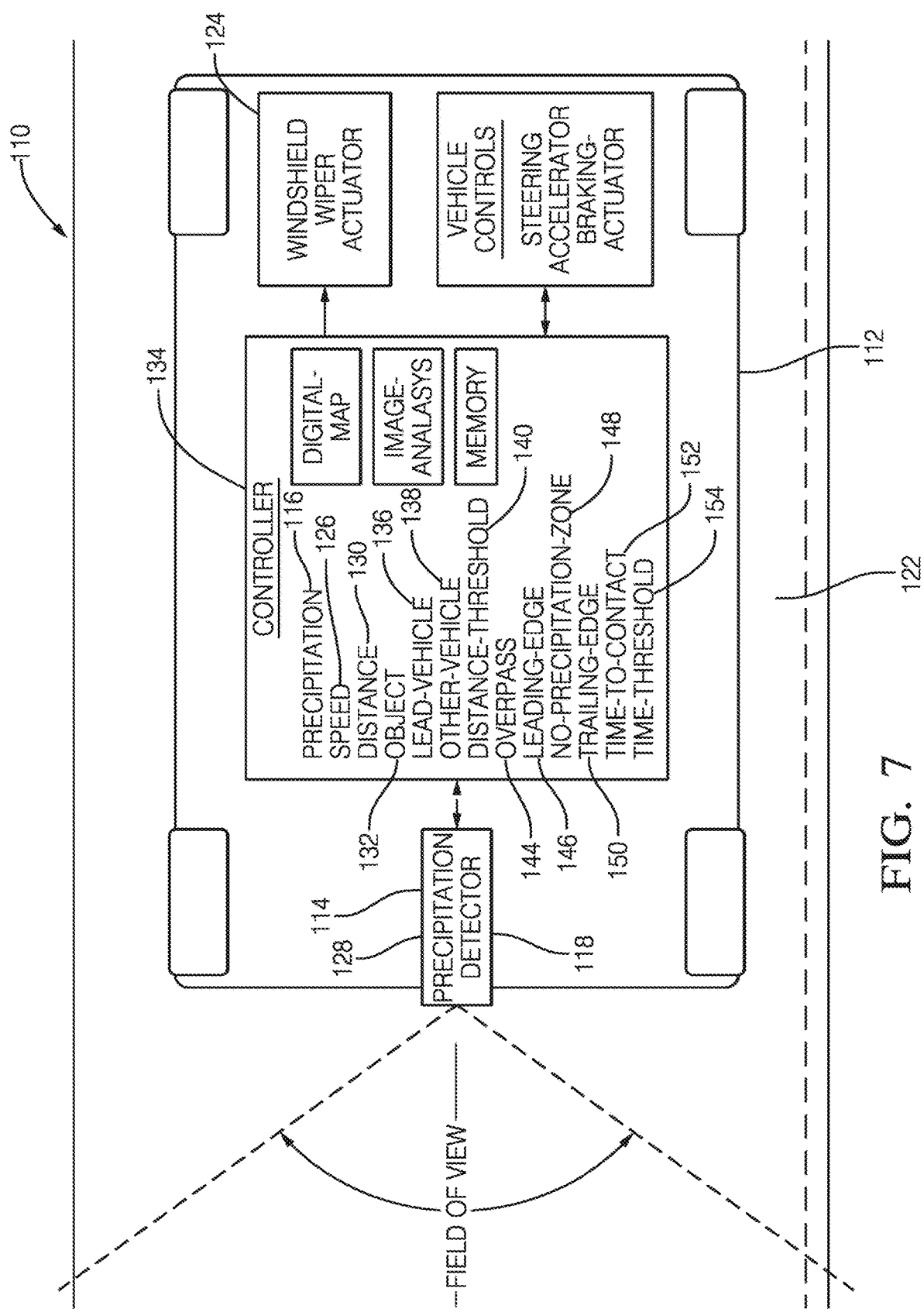
FIG. 7 is an illustration of a windshield-wiper system in accordance with yet another embodiment.

FIG. 7 illustrates yet another non-limiting example of an automated vehicular windshield-wiper system 110, hereafter referred to as the system 110, for use on an automated vehicle 112, hereafter referred to as a host-vehicle 112. The system 110 includes a precipitation-detector 114 that detects precipitation 116 proximate to the host-vehicle 112. The precipitation-detector 114 may be a camera 118. Examples of the camera 118 suitable for use on the host-vehicle 112 are commercially available as will be recognized by those in the art, one such being the APTINA MT9V023 from Micron Technology, Inc. of Boise, Id., USA. The camera 118 may be mounted on the front of the host-vehicle 112, or mounted in the interior of the host-vehicle 112 at a location suitable for the camera 118 to view the area around the host-vehicle 112 through the windshield 120 of the host-vehicle 112. The camera 118 is preferably a video-type camera 118 or camera 118 that can capture images of a roadway 122 and surrounding area at a sufficient frame-rate, of ten frames per second, for example. The precipitation-detector 114 may also be an optical-device mounted to an inside-surface of the windshield 120 that detects the precipitation 116 on the windshield 120 of the host-vehicle 112. Examples of the optical-device suitable for use on the host-vehicle 112 are commercially available as will be recognized by those in the art, one such being the RMS3ALS from Robert Bosch LLC of Farmington Hills, Mich., USA. The precipitation-detector 114 may also be a lidar that detects the precipitation 116 before the precipitation 116 reaches the windshield 120. The lidar has the added benefit of being both the precipitation-detector 114 and an object-detector 128.

The system 110 also includes a windshield-wiper 124 that clears the precipitation 116 from the windshield 120 of the host-vehicle 112. The windshield-wiper 124 may include a DC electric-motor, one or more wiper-arms, and a mechanical linkage between the electric-motor and the one or more wiper-arms, as will be understood by those in the art. The electric-motor may be capable of a range of speeds 126 and/or may be capable of operating in a pulsed mode.

The system 110 also includes a controller 134 in communication with the precipitation-detector 114 and the windshield-wiper 124. The controller 134 may include a processor (not shown) such as a microprocessor or other control circuitry such as analog and/or digital control circuitry including an application specific integrated circuit (ASIC) for processing data as should be evident to those in the art. The controller 134 may include a memory (not specifically shown), including non-volatile memory, such as electrically erasable programmable read-only memory (EEPROM) for storing one or more routines, thresholds, and captured data. The one or more routines may be executed by the processor to perform steps for determining if a change in a rate of precipitation 116 exists based on signals received by the controller 134 from the precipitation-detector 114, as described herein. The controller 134 may also include an image-analysis device for processing an image captured by the camera 118 that may be used as the precipitation-detector 114. The image detected or captured by the camera 118 is processed by the controller 134 using known techniques for image-analysis to identify objects 132. Vision processing technologies, such as the EYE Q® platform from Moblieye Vision Technologies, Ltd. of Jerusalem, Israel, or other suitable devices may be used.

Figure 8:
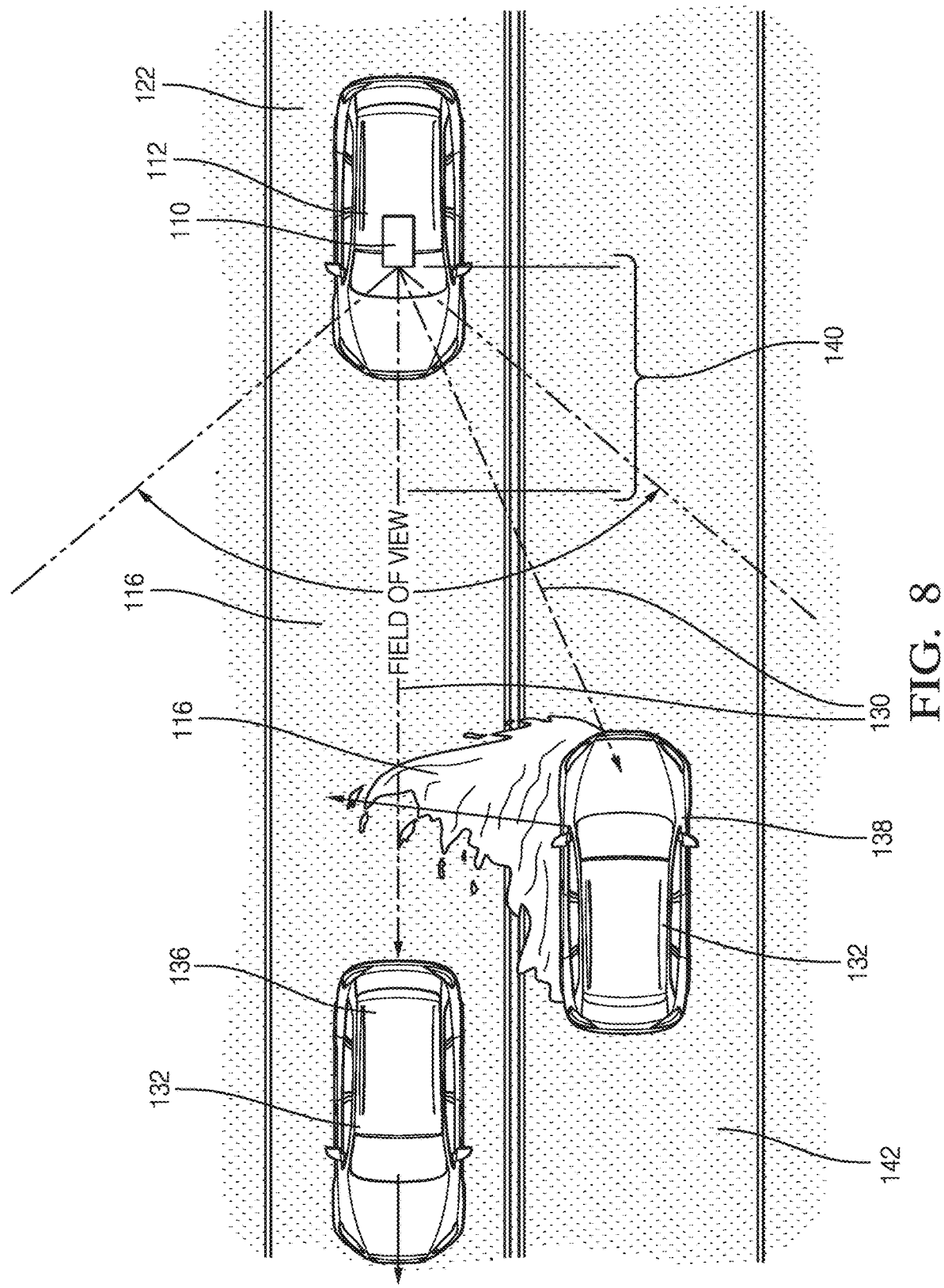
FIG. 8 is an illustration of a traffic scenario of a host-vehicle equipped with the windshield-wiper system of FIG. 7 in accordance with yet another embodiment.

FIG. 8 illustrates a traffic scenario where the host-vehicle 112 equipped with the system 110 is traveling on the roadway 122 behind a lead-vehicle 136 and an other-vehicle 138 is traveling toward the host-vehicle 112 in an adjacent-lane 142. Precipitation 116 is present (e.g. rain, snow, sleet, slush, etc.) and the other-vehicle 138 is splashing precipitation 116 from the adjacent-lane 142 into a lane traveled by the host-vehicle 112. The controller 134 determines when a change in the rate of precipitation 116 on the windshield 120 will occur, based on the precipitation-detector 114, and adjusts a speed 126 of the windshield-wiper 124 to correspond to the rate of precipitation 116. That is, the controller 134 predicts when the splash of precipitation 116 from the other-vehicle 138 will contact the windshield 120 of the host-vehicle 112 and increases the speed 126 of the windshield-wiper 124 before the splash reaches the windshield 120. Preferably, the speed 126 of the windshield-wiper 124 will achieve a steady-state value predetermined by the controller 134 prior to the splash contacting the windshield 120. The controller 134 may determine a distance 130 from the other-vehicle 138 to the host-vehicle 112 based on the lidar, and adjust the speed 126 of the windshield-wiper 124 when the precipitation 116 is detected and the other-vehicle 138 is less than a distance-threshold 140 away from the host-vehicle 112. The distance-threshold 140 may be user defined and may be varied based on an identity of the other-vehicle 138 (e.g. a car or a truck), and/or the relative rate-of-closure between the other-vehicle 138 and the host-vehicle 112, and/or the type and rate of the precipitation 116.

Figure 9:
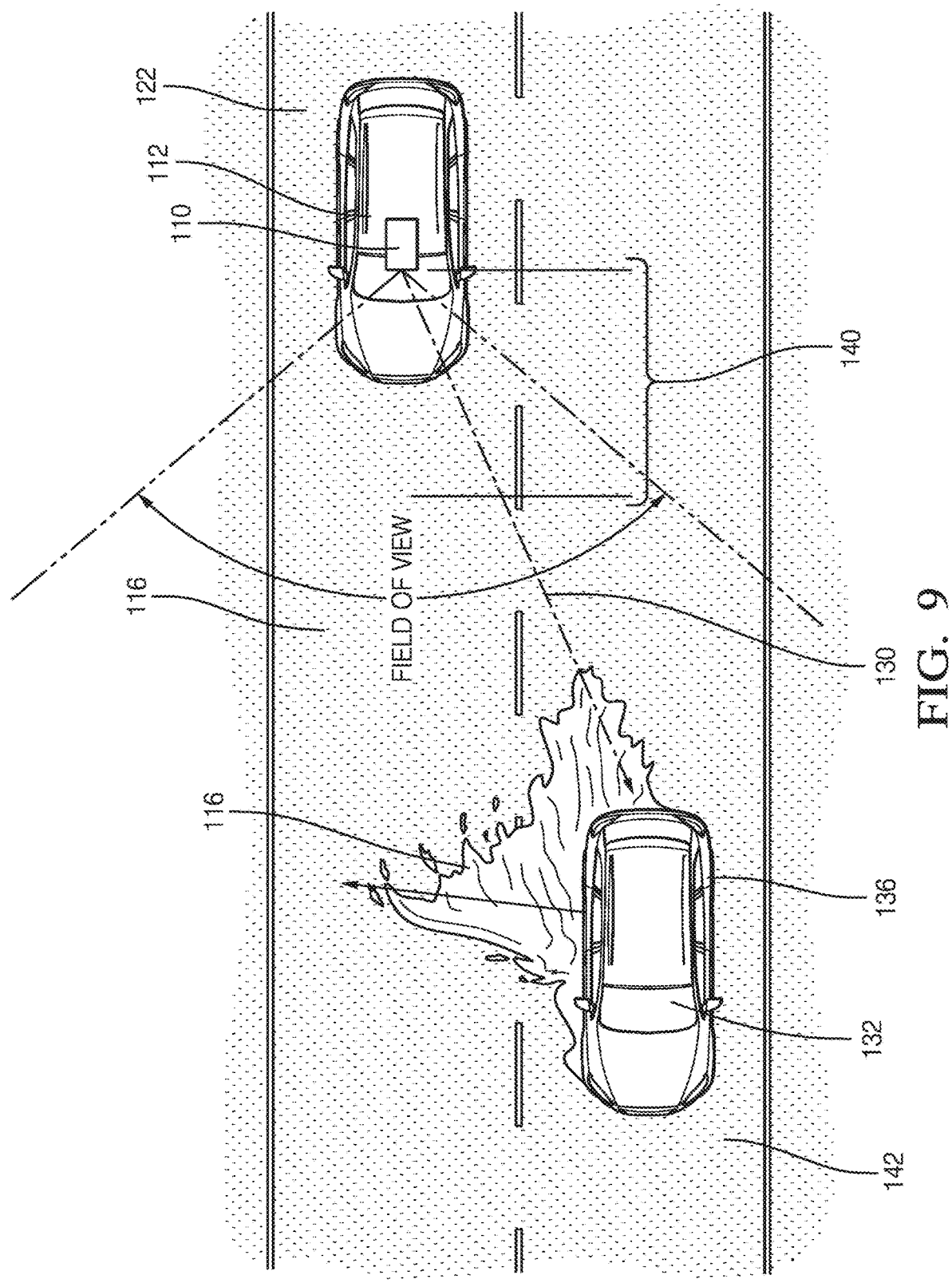
FIG. 9 is an illustration of the host-vehicle of FIG. 8 in another traffic scenario in accordance with yet another embodiment.

FIG. 9 illustrates another traffic scenario where the host-vehicle 112 equipped with the system 110 is traveling on the roadway 122 behind the lead-vehicle 136 in the adjacent-lane 142. Precipitation 116 is present (e.g. rain, snow, sleet, slush, etc.) and the lead-vehicle 136 is splashing precipitation 116 from the adjacent-lane 142 into the lane traveled by the host-vehicle 112. The controller 134 may increase the speed 126 of the windshield-wiper 124 when the lead-vehicle 136 is less than the distance-threshold 140 away from the host-vehicle 112. While not specifically shown, it will be understood that the system 110 would also function in the traffic scenario where the lead-vehicle 136 is traveling in the same lane as the host-vehicle 112 (see FIG. 7) and the lead-vehicle 136 is splashing precipitation 116 behind the lead-vehicle 136 (e.g. road spray) as the host-vehicle 112 approaches the lead-vehicle 136 from behind.

Figure 10:
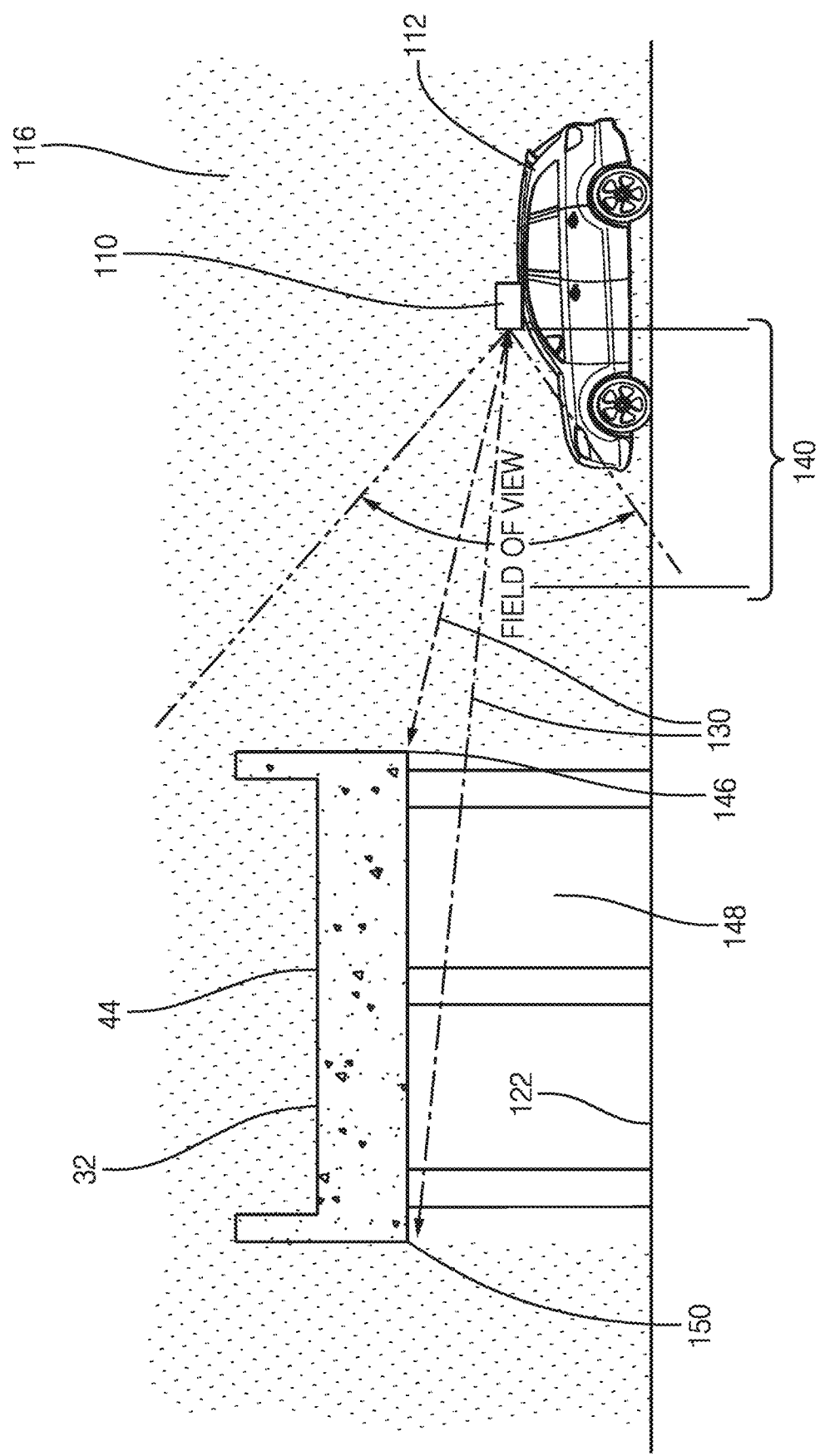
FIG. 10 is an illustration of the host-vehicle of FIG. 8 in yet another traffic scenario in accordance with yet another embodiment.

FIG. 10 illustrates yet another traffic scenario where the host-vehicle 112 is traveling in precipitation 116 and approaching an overpass 144. The overpass 144 may include bridges, walkways, and/or tunnels. The controller 134 may determine that the object 132 is the overpass 144 based on signals received from the lidar. The controller 134 may also determine that the object 132 is the overpass 144 based on a digital-map (not specifically shown). The controller 134 may reduce the speed 126 of the windshield-wiper 124 when a leading-edge 146 of the overpass 144 is less than the distance-threshold 140 away from the host-vehicle 112. This is advantageous because the host-vehicle 112 will be entering a no-precipitation-zone 148 as it passes beneath the overpass 144. The distance-threshold 140 may be zero, or may also be a negative-value such that the windshield 120 is within the no-precipitation-zone 148 when the controller 134 reduces the speed 126 of the windshield-wiper 124 to clear any residual precipitation 116. Additionally, the controller 134 may completely stop the actuation of the windshield-wiper 124 when the host-vehicle 112 is beneath the overpass 144 when no precipitation 116 is detected.

Referring again to FIG. 10, the controller 134 may further determine when the host-vehicle 112 will emerge from beneath the overpass 144 (i.e. exit the no-precipitation-zone 148) based on signals received from the lidar, and may increase the speed 126 of the windshield-wiper 124 when the distance 130 of a trailing-edge 150 of the overpass 144 is less than the distance-threshold 140 away from the host-vehicle 112. This is beneficial because the system 110 anticipates the sudden increase in the rate of precipitation 116 as the host-vehicle 112 emerges from beneath the overpass 144 and the operator does not need to manually adjust the windshield-wiper 124.

Figure 11:
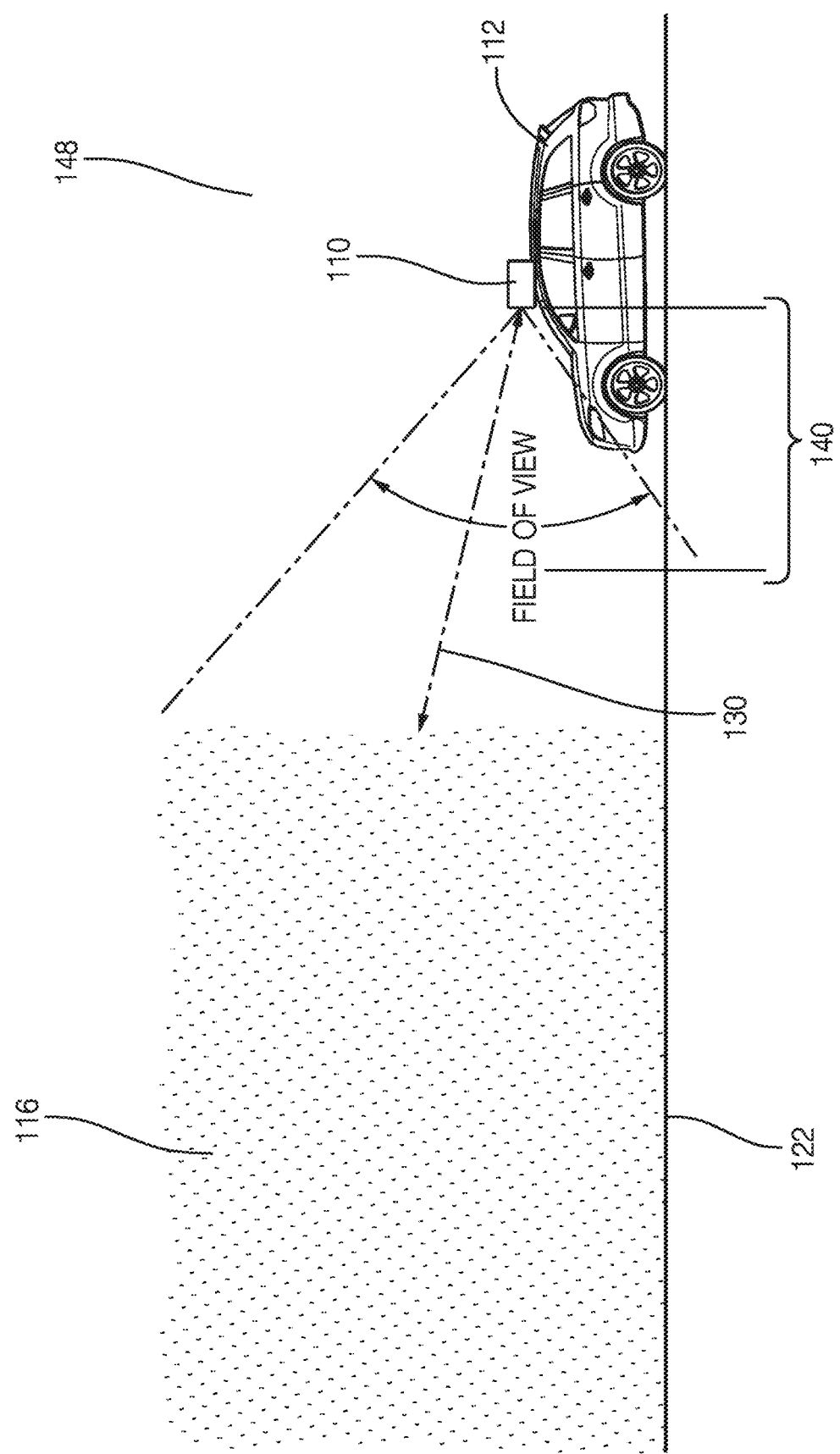
FIG. 11 is an illustration of the host-vehicle of FIG. 8 in yet another traffic scenario in accordance with yet another embodiment.

FIG. 11 illustrates yet another traffic scenario where the host-vehicle 112 is driving in the no-precipitation-zone 148 and the controller 134 determines the precipitation 116 is present ahead of the host-vehicle 112 based on the signals received from the precipitation-detector 114. The controller 134 may increase the speed 126 of the windshield-wiper 124 when the distance 130 from the precipitation 116 is less than the distance-threshold 140 away from the host-vehicle 112.

Accordingly, a windshield-wiper system 10, a controller 34 for the windshield-wiper system 10 and a method 200 of operating the windshield-wiper system 10 is provided. The system 10 is beneficial because it anticipates the sudden change in the rate of precipitation 16 and adjusts the speed 26 of the windshield-wiper actuator 24 before the windshield 20 is affected.

While this invention has been described in terms of the preferred embodiments thereof, it is not intended to be so limited, but rather only to the extent set forth in the claims that follow.

What is claimed is:

1. A system comprising:
a controller of a host vehicle in communication with a precipitation detector, an object detector, and a windshield wiper actuator, and when the host vehicle travels on a roadway, the controller being configured to:
determine, based on the precipitation detector, when precipitation is present in proximity to the host vehicle;
determine, based on the object detector, a distance from an object on the roadway to the host vehicle;
determine whether an identity of the object is an entrance to a tunnel or overpass of the roadway or an exit from the tunnel or overpass;
define, based on the identity of the object being the entrance to the tunnel or overpass or the exit from the tunnel or overpass, a distance threshold away from the host vehicle for adjusting the windshield wiper actuator; and
adjust a speed of the windshield wiper actuator when the precipitation is present and the distance is less than the distance threshold.

2. The system of claim 1, wherein the object comprises the entrance to the tunnel or overpass, and the controller is configured to adjust the speed of the windshield wiper actuator by decreasing the speed of the windshield wiper actuator.

3. The system of claim 1, wherein the object comprises the exit from the tunnel or an overpass, and the controller is further configured to adjust the speed of the windshield wiper actuator by increasing the speed of the windshield wiper actuator.

4. The system in accordance with claim 1, wherein the precipitation detector comprises an optical device.

5. The system in accordance with claim 4, wherein the precipitation detector comprises a camera.

* * * * *